(12) United States Patent
Chu

(10) Patent No.: US 7,861,370 B2
(45) Date of Patent: Jan. 4, 2011

(54) CASTER WITH BRAKE UNIT AND DIRECTION UNIT

(76) Inventor: Keio Chu, No.10, Lane 480, Sec. 1, Jhongshan Rd., Tanzih Township, Taichung County 427 (TW)

( * ) Notice: Subject to any disclaimer, the term of this patent is extended or adjusted under 35 U.S.C. 154(b) by 36 days.

(21) Appl. No.: 12/285,964

(22) Filed: Oct. 17, 2008

(65) Prior Publication Data

US 2009/0113671 A1    May 7, 2009

(30) Foreign Application Priority Data

Nov. 6, 2007   (TW) .............................. 96141886 A

(51) Int. Cl.
*B60B 33/00* (2006.01)
(52) U.S. Cl. ...................................... 16/35 R
(58) Field of Classification Search .............. 16/35 R; 188/1.12
See application file for complete search history.

(56) References Cited

U.S. PATENT DOCUMENTS

| | | | | |
|---|---|---|---|---|
| 1,671,774 A * | 5/1928 | McIntosh | ..................... | 16/35 R |
| 2,484,094 A * | 10/1949 | Jackson | ..................... | 188/77 R |
| 2,777,546 A * | 1/1957 | Kelley | ..................... | 188/176 |
| 3,571,842 A * | 3/1971 | Fricke | ..................... | 16/35 R |
| 4,035,864 A * | 7/1977 | Schroder | ..................... | 16/35 R |
| 4,835,815 A * | 6/1989 | Mellwig et al. | ..................... | 16/35 R |
| 5,191,675 A * | 3/1993 | Ishikura | ..................... | 16/35 R |
| 5,988,323 A * | 11/1999 | Chu | ..................... | 188/1.12 |
| 6,360,851 B1 * | 3/2002 | Yang | ..................... | 188/1.12 |
| 6,532,624 B1 * | 3/2003 | Yang | ..................... | 16/35 R |
| 7,516,512 B2 * | 4/2009 | Tsai | ..................... | 16/35 R |
| 2002/0069478 A1 * | 6/2002 | Trivini | ..................... | 16/35 R |
| 2006/0016949 A1 * | 1/2006 | Payne | ..................... | 248/346.01 |
| 2009/0019670 A1 * | 1/2009 | Tsai | ..................... | 16/35 R |
| 2009/0276977 A1 * | 11/2009 | Liao | ..................... | 16/35 R |

* cited by examiner

*Primary Examiner*—Victor Batson
*Assistant Examiner*—Matthew Sullivan
(74) *Attorney, Agent, or Firm*—Rosenberg, Klein & Lee

(57) ABSTRACT

A caster includes a casing having a shank and a locking unit is located at a lower end of the shank. Two wheels are connected to two sides of the casing by a shaft and an inner gear is connected to each of the two wheels. A direction unit is located in the casing and includes a first lever and an opening, the first lever connects the direction unit to the locking unit. A brake unit is located in the casing and includes a second lever. The second lever connects the brake unit to the locking unit and the inner gears. The second lever is engaged with the opening of the first lever and shares a common pivot with the first lever so as to respectively brake the caster and control direction of the caster.

16 Claims, 7 Drawing Sheets

CASTER WITH BRAKE UNIT AND DIRECTION UNIT

FIELD OF THE INVENTION

The present invention relates to a caster for bed, desk, furniture or the like and includes a brake unit for braking the caster and a direction unit for setting movement direction.

BACKGROUND OF THE INVENTION

A conventional way to move a heavy object such as a bed, a desk or a piece of furniture is to connect multiple wheels at the underside of the object so as to easily move the object. The wheels can move in one direction and cannot turn. The casters are then developed which are able to turn so that the casters provide more convenient functions to the users. Nevertheless, the casters will move when the object is located on an inclined surface and may cause damage to the object. Therefore, a brake unit is installed to the caster so as to brake to prevent moving on an inclined surface. Some casters further have a direction unit which controls the casters to move in the desired direction.

The conventional casters may include one wheel or two wheels, the brake unit for one-wheel caster can direct touch the wheel to brake it. The two-wheel caster includes an inner gear cooperated with a brake lever to be engage with the inner gear to stop the casters.

As shown in FIGS. 6 and 7, the conventional casters with brake unit and direction unit generally include a brake lever 52 and a direction lever 51 which is located side-by-side to the brake lever 52. Both of the brake lever 52 and the direction lever 51 are controlled by an operation unit to selectively operate either of the brake lever 52 or the direction lever 51. The side-by-side brake lever 52 and the direction lever 51 are located so close and look alike so that the user often to operate on the wrong lever.

The present invention intends to provide a caster which has a brake unit and a direction unit, and the two units can be operated by two respective levers so that the user can correctly operate the caster.

SUMMARY OF THE INVENTION

The present invention relates to a caster which comprises a casing and a shank is radially connected to the casing. Two wheels are connected to two sides of the casing by extending a shaft through the two wheels and the casing. An inner gear is connected to each of the two wheels. A locking unit is located at a lower end of the shank. A direction unit is located in the casing and includes a first lever and an opening, wherein the first lever connects the direction unit to the locking unit. A brake unit is located in the casing and includes a second lever which connects the brake unit to the locking unit and the inner gears. The second lever is engaged with the opening of the first lever and shares a common pivot with the first lever so as to respectively brake caster and control direction of the caster.

The primary object of the present invention is to provide a caster including a first lever to control the braking of the caster and a second lever to direction that the caster moves. The second lever is located in the center of the first lever such that the user can easily tell the two different levers.

Another object of the present invention is to provide a caster including a cushion pad which protects the wheels of the caster.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
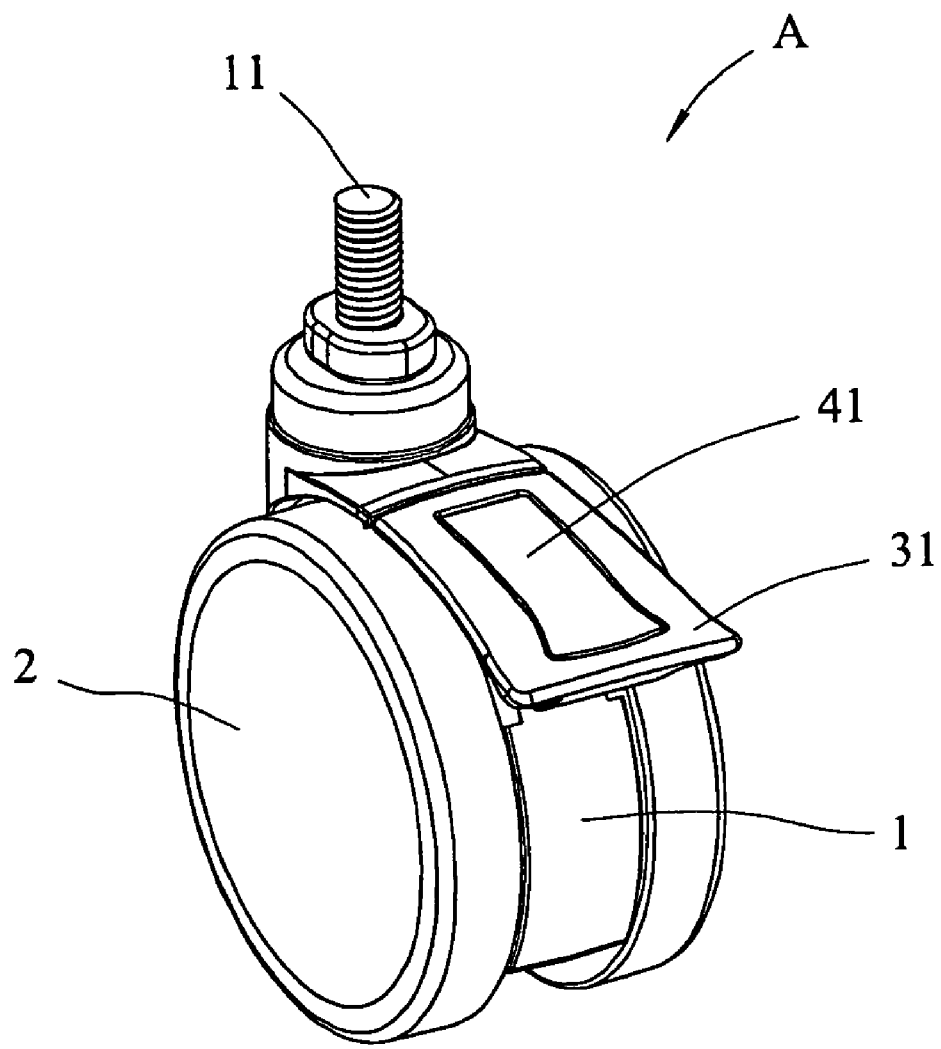
FIG. 1 is a perspective view to show the caster of the present invention.
Figure 2:
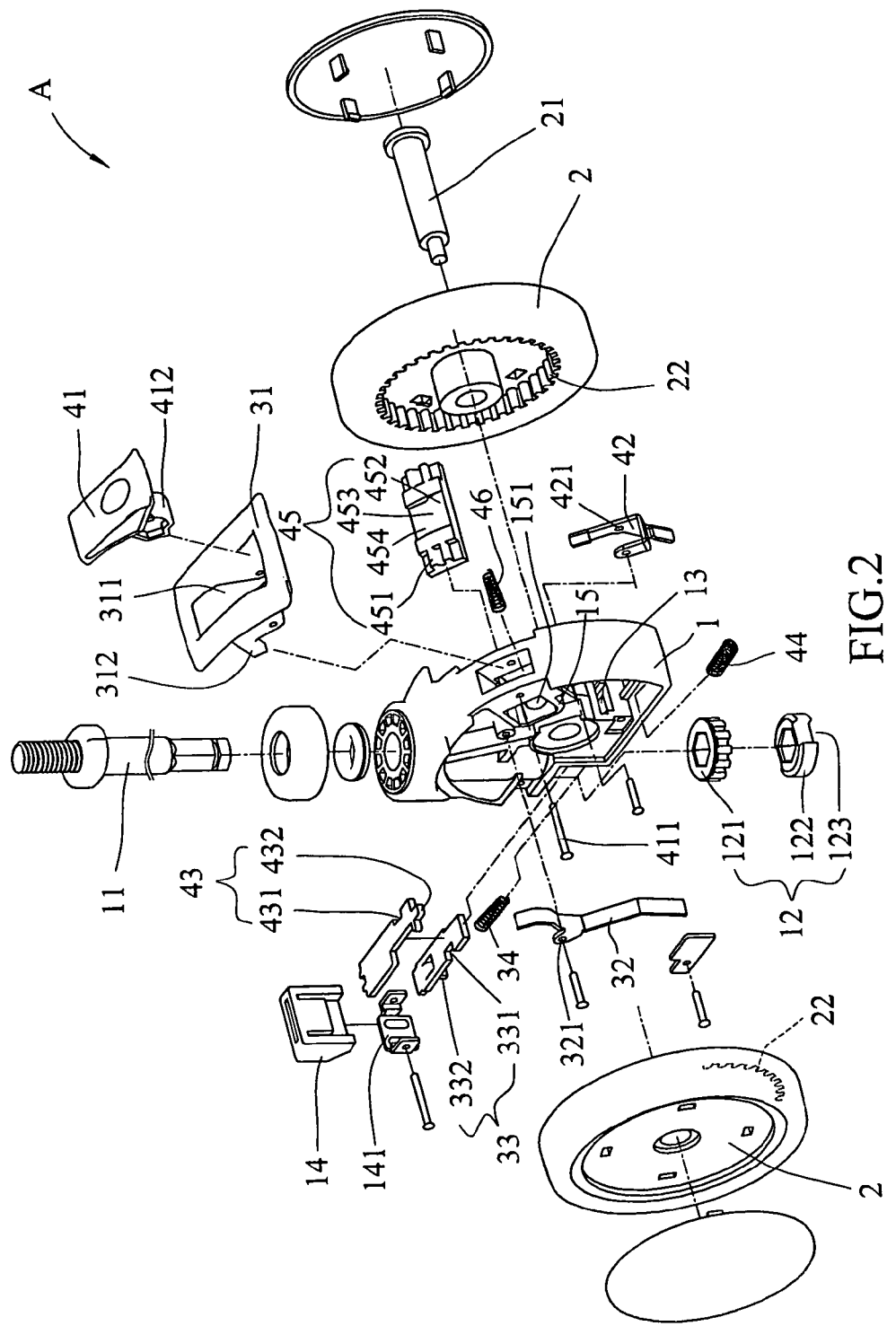
FIG. 2 is an exploded view to show the caster of the present invention.
Figure 3:
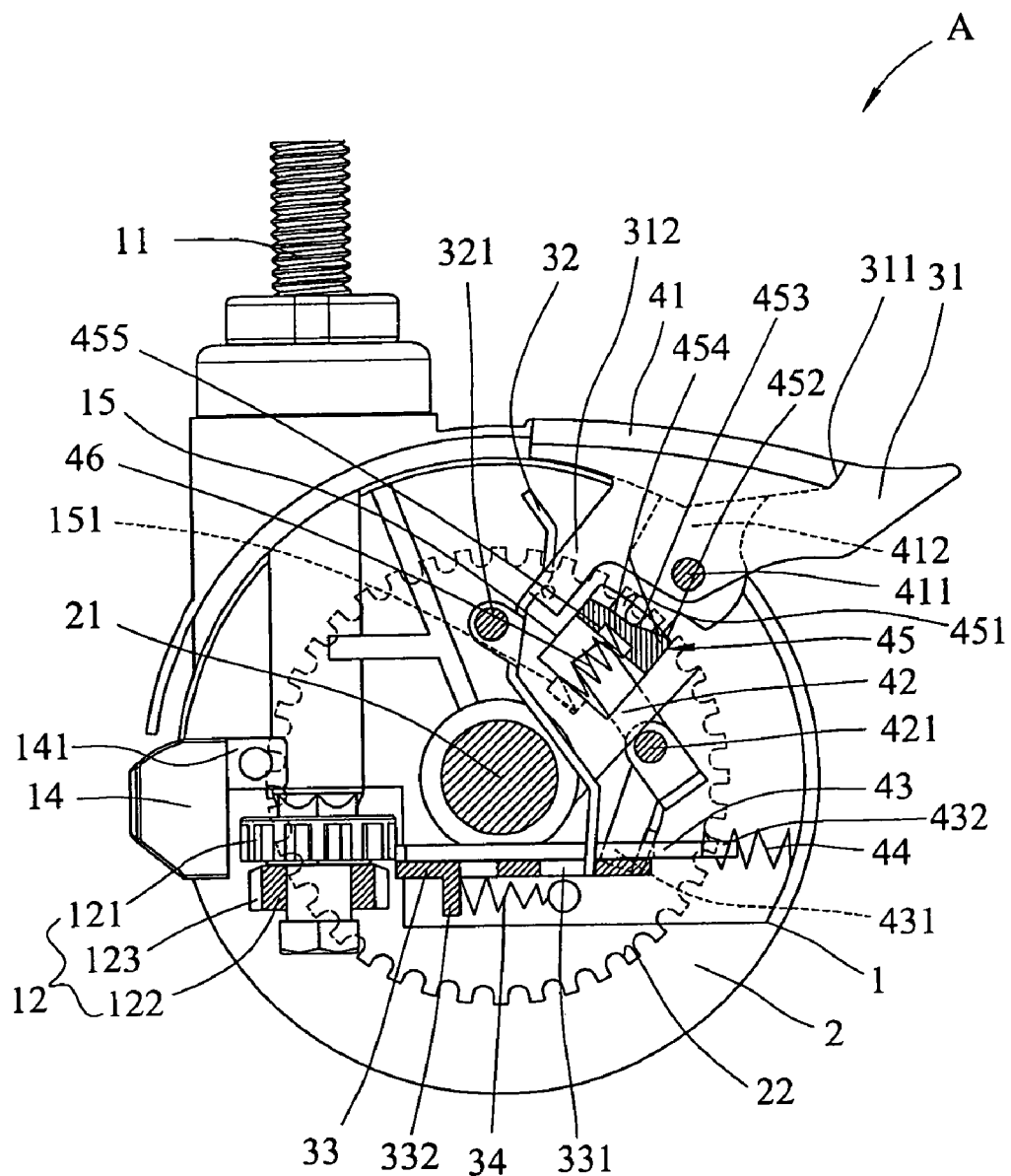
FIG. 3 is a partial cross sectional view to show the caster of the present invention.

Referring to FIGS. 1 to 3, the caster "A" of the present invention comprises a casing 1, two wheels 2, a direction unit 3 and a brake unit. A shank 11 is radially connected to the casing 1 so that the casing 1 is rotatable about the shank 11, and a locking unit 12 is located at a lower end of the shank 11. The locking unit 12 includes a gear 121 and a direction plate 122. The direction plate 122 includes multiple radial recesses 123 defined in the outer periphery thereof. The number of the radial recesses 123 can be two and located at opposite ends of the diameter of the direction plate 122. A cushion pad 14 is connected to the casing 1 and located outside of the locking unit 12. The cushion pad 14 is connected to a frame 141 fixed to the casing 1.

The two wheels 2 are connected to two sides of the casing 1 and a shaft 21 extends through the two wheels 2 and the casing 1. An inner gear 22 is connected to each of the two wheels 2.

The direction unit 3 is located in the casing 1 and includes a first lever 31, a first plate 32, a first piece 33 and a first spring 34. The first lever 31 connects the direction unit 3 to the locking unit 12. The first plate 32 includes a pivot 321 at a mediate portion thereof and the first plate 32 is pivotably connected to the casing 1 by the pivot 321. The first plate 32 has one end contacting an extension 312 on an underside of the first lever 31, and the other end of the first plate 32 is inserted into a side notch 331 of the first piece 33. The first piece 33 is horizontally engaged with a slot 13 in the casing 1 and a first protrusion 332 extends from an underside of the first piece 33. A first spring 34 biases the first protrusion 332 to provide a force to push the first protrusion 332. The first plate 32 is a flexible plate and the first spring 34 is a cone-shaped spring in this embodiment.

The brake unit is located in the casing 1 and includes a second lever 41, a second plate 42, a second piece 43, a second spring 44, a return spring 46 and a guide plate 45. The second lever 41 connects the brake unit to the locking unit 12 and the inner gears 22. The first lever 31 includes an opening 311 and the second lever 41 is engaged with the opening 311. The second lever 41 shares a common pivot 411 with the first lever 31 so as to respectively brake caster and control direction of the caster "A".

The second plate 42 includes a pivotal point 421 at a mediate portion thereof and is pivotably connected to the casing 1 by the pivotal point 421. The second plate 42 has one end contacting an underside of the guide plate 45 and the other end of the second plate 42 is inserted into a side hole 431 of the second piece 43. The second piece 43 is horizontally engaged with a slot 13 in the casing 1 and has a second protrusion 432 extending from one end thereof, the second protrusion 432 is biased by the second spring 44. The guide plate 45 includes multiple grooves 451 and includes a curved surface composed of a high point 452, a concaved and inclined surface 453 and a low point 454. The second lever 41 has a leg 412 contacting the curved surface. The casing 1 further includes a passage 15 and the guide plate 45 is guided within the passage 15 and the return spring 46 is located at an underside of the guide plate 45. The passage 15 has a concavity 151 and the guide plate 45 has a reception recess 455, two ends of the return spring 46 are engaged with the concavity 151 and the reception recess 455.

As shown in FIG. 3, the first spring 34 of the direction unit 3 contacts the first protrusion 332 of the first lever 33 so as to apply a horizontal force to the first lever 33. Because the first plate 32 is engaged with the side notch 331 of the first lever 33 so that the first spring 34 stores a force and the first lever 33 has not yet engaged with the radial recess 123 of the direction plate 122. The force of the first spring 34 is transferred to the first lever 31 via the extension 312 so that the first lever 31 is in the non-operation status. Besides, the second spring 44 biases the second protrusion 432 of the second piece 43 so that the second spring 44 applies a horizontal force to the second piece 43. The second plate 42 is engaged with the side hole 431 of the second piece 43, so that the second spring 44 stores a force. Because the second piece 43 has not yet engaged with the gear 121 so that the force from the second spring 44 is transferred to the second lever 41 via the guide plate 45 and the second lever 41 is in the non-operation status. It is noted that the leg 412 of the second lever 41 contacts against the high point 452 of the concaved and inclined surface 453.

Figure 4:
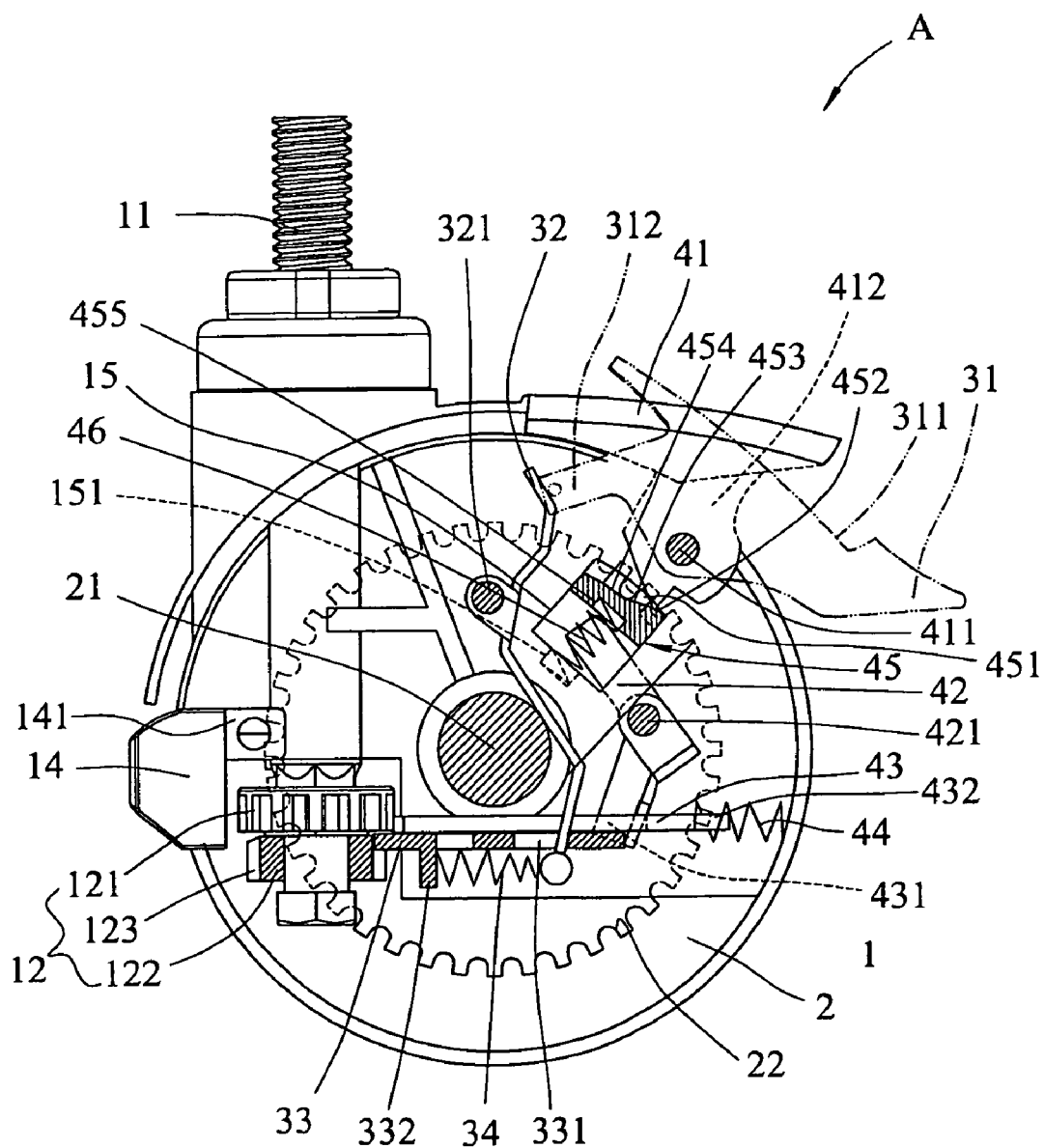
FIG. 4 is a partial cross sectional view to show that the direction unit of the caster of the present invention is activated.

As shown in FIG. 4, when the user wants the casters "A" to move straight, the first lever 31 is pushed which is pivoted clockwise about the common pivot 411 and the extension 312 pushes the first plate 32 to pivot about the pivot 321 clockwise. The contact point between the first plate 32 and the first piece 33 will move to left side of FIG. 4 and the first spring 34 pushes the first piece 33 toward the outer periphery of the direction plate 122. If the radial recess 123 of the direction plate 122 does not precisely align the first piece 133, the user can move slightly the caster "A" to let the caster "A" rotate about the shank 11, such that the radial recess 123 can be aligned with the first piece 133, the first spring 34 then pushes the first piece 133 to be engaged with the radial recess 123. The caster "A" is then restricted to move straight, forward or backward.

Figure 5:
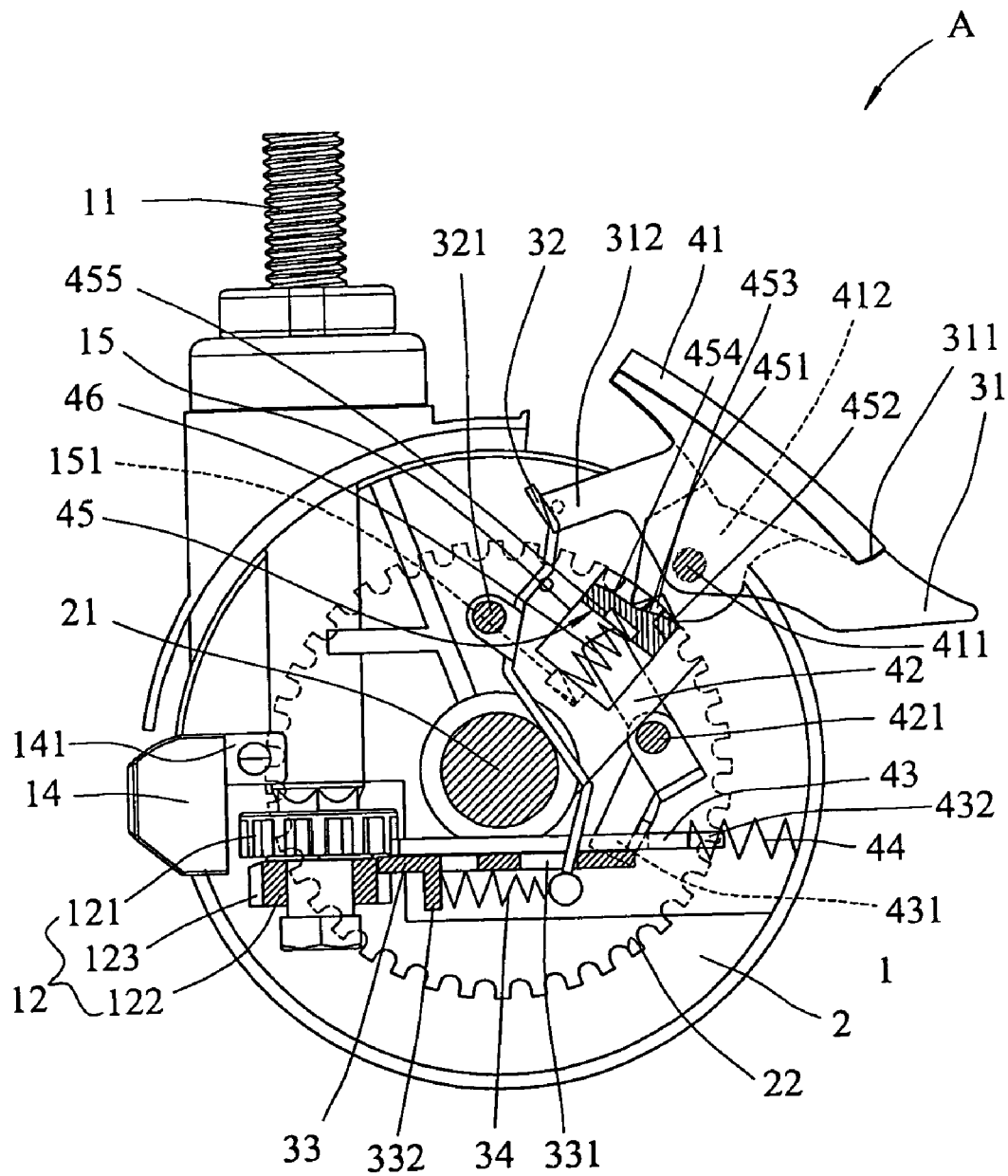
FIG. 5 is a partial cross sectional view to show that the brake unit of the caster of the present invention is activated.
Figure 6:
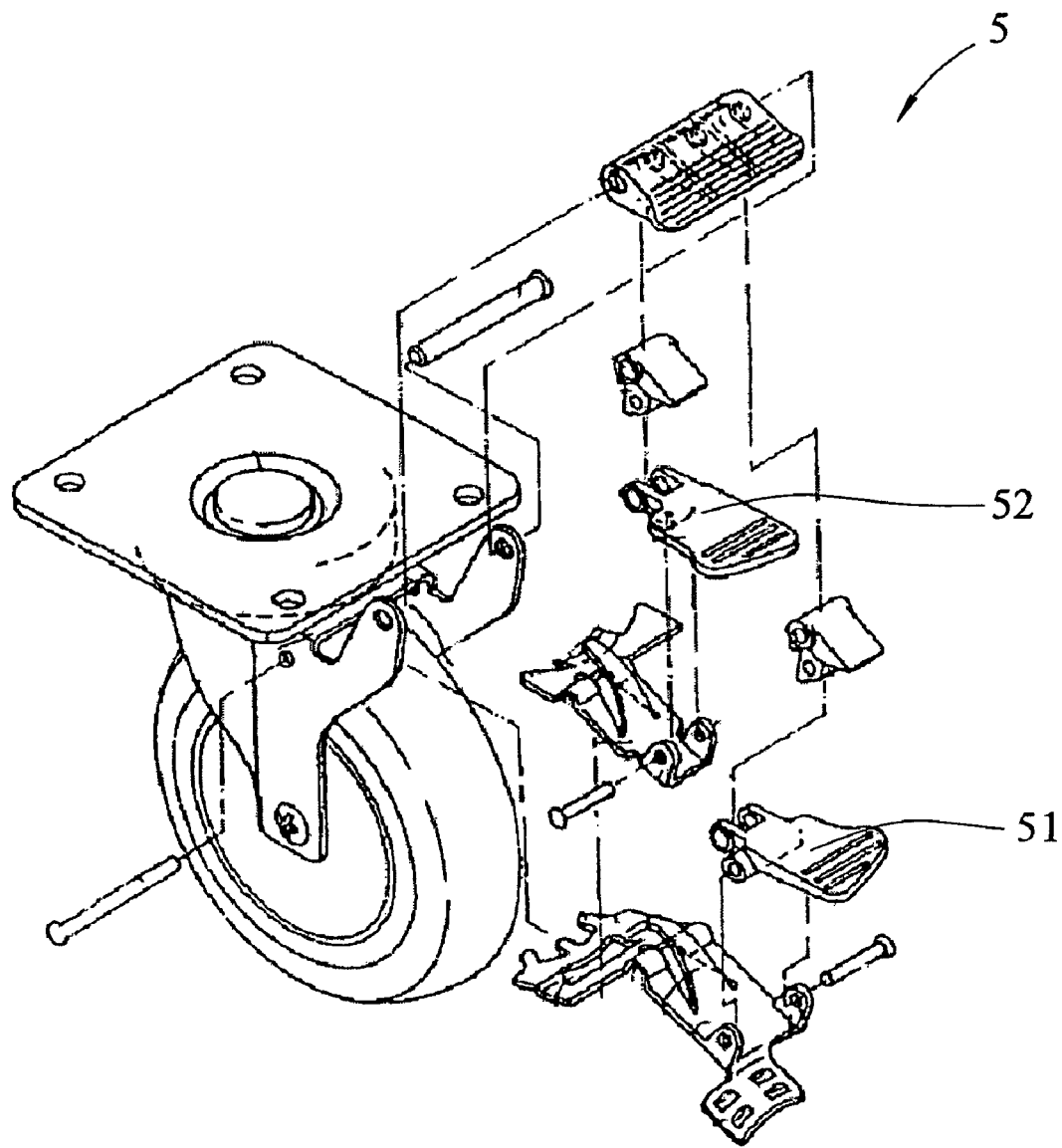
FIG. 6 is an exploded view to show a conventional caster.
Figure 7:
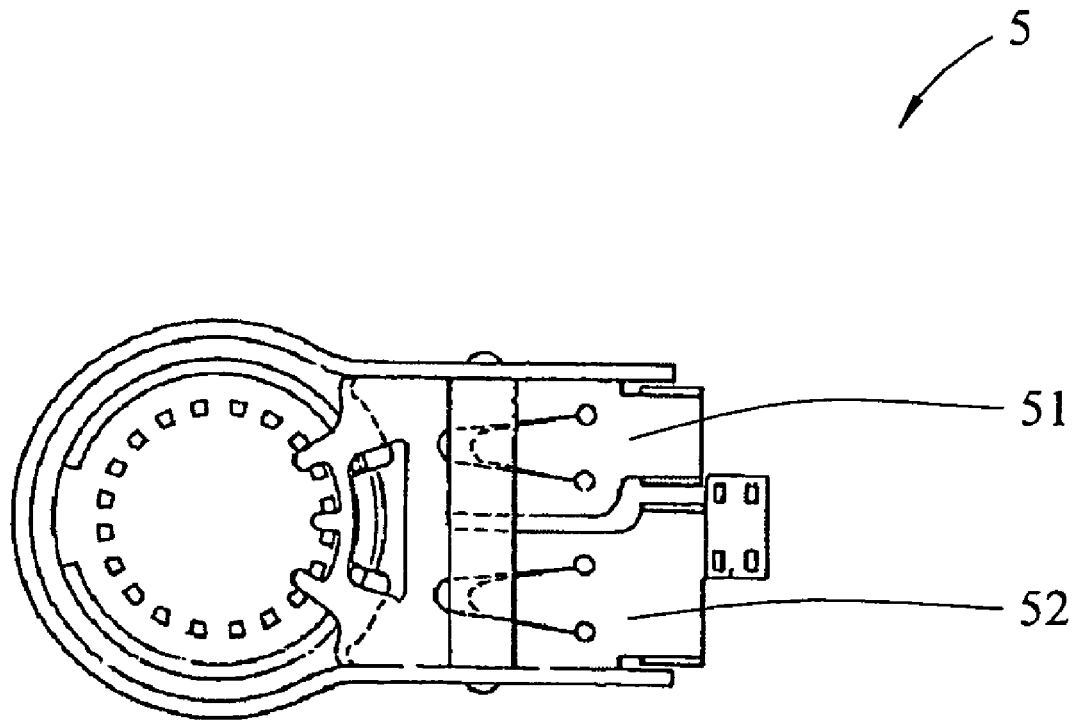
FIG. 7 is a bottom view of the conventional caster.

As shown in FIG. 5, when the user wants to stop the caster "A", the second lever 41 is pushed which is pivoted about the common pivot 411 clockwise and the leg 412 moves from the high point 452 of the concaved and inclined surface 45 to the low point 454. The second spring 44 pushes the second piece 43 to engage with the gear 121. The second piece 43 shifts the second plat 42 which is pivoted about the pivotal point 421 clockwise and moves the guide plat 45 upward to let the leg 412 firmly contact the low point 454. The grooves 451 of the guide plate 45 are engaged with the two respective inner gears 22 of the two wheels 2. Therefore, the second piece 43 and the guide plate 45 are simultaneously locked so as to stop the wheels 2.

When releasing the locked status, the first lever 31 is lifted and the first and second springs 34, 44 together with the return spring 46 move the first and second levers 31, 41 to return their original positions. The caster "A" can be moved again. Furthermore, the cushion pad 14 is located to protect the locking unit 12 from being hit.

While we have shown and described the embodiment in accordance with the present invention, it should be clear to those skilled in the art that further embodiments may be made without departing from the scope of the present invention.

What is claimed is:

1. A caster (A) comprising:
a casing (1) having a shank (11) which is radially connected to the casing (1) and a locking unit (12) is located at a lower end of the shank (11);
two wheels (2) connected to two sides of the casing (1) and a shaft (21) extending through the two wheels (2) and the casing (1), an inner gear (22) connected to each of the two wheels (2);
a direction unit (3) located in the casing (1) and including a first lever (31) and an opening (311), the first lever (31) connecting the direction unit (3) to the locking unit (12); and
a brake unit located in the casing (1) and including a second lever (41), the second lever (41) connecting the brake unit to the locking unit (12) and the inner gears (22), the second lever (41) being engaged with the opening (311) of the first lever (31) and sharing a common pivot (411) with the first lever (31) to respectively brake the caster and control direction of the caster, the brake unit further including a second plate (42), a second piece (43), a second spring (44), a return spring (46) and a guide plate (45).

2. The caster as claimed in claim 1, wherein the locking unit (12) includes a gear (121) and a direction plate (122).

3. The caster as claimed in claim 2, wherein the direction plate (122) includes multiple radial recesses (123).

4. The caster as claimed in claim 1, wherein the direction unit (3) includes a first plate (32), a first piece (33) and a first spring (34).

5. The caster as claimed in claim 4, wherein the first plate (32) includes a pivot (321) at a mediate portion thereof and the first plate (32) is pivotably connected to the casing (1) by the pivot (321), the first plate (32) has one end contacting an extension (312) on an underside of the first lever (31), the other end of the first plate (32) is inserted into a side notch (331) of the first piece (33).

6. The caster as claimed in claim 5, wherein the first piece (33) is horizontally engaged with a slot (13) in the casing (1) and a first protrusion (332) extends from an underside of the first piece (33), a first spring (34) biases the first protrusion (332).

7. The caster as claimed in claim 6, wherein the first plate (32) is a flexible plate.

8. The caster as claimed in claim 6, wherein the first spring (34) is a cone-shaped spring.

9. The caster as claimed in claim 1, wherein the second plate (42) includes a pivotal point (421) at a mediate portion thereof and is pivotably connected to the casing (1) by the pivotal point (421), the second plate (42) has one end contacting an underside of the guide plate (45) and the other end of the second plate (42) is inserted into a side hole (431) of the second piece (43).

10. The caster as claimed in claim 9, wherein the second piece (43) is horizontally engaged with a slot (13) in the casing (1) and has a second protrusion (432) extending from one end thereof, the second protrusion (432) is biased by the second spring (44).

11. The caster as claimed in claim 10, wherein the guide plate (45) includes multiple grooves (451) and includes a curved surface composed of a high point (452), a concaved and inclined surface (453) and a low point (454), the second lever (41) has a leg (412) contacting the curved surface.

12. The caster as claimed in claim 1, wherein the casing (1) includes a passage (15) and the guide plate (45) is guided within the passage (15) and the return spring (46) is located at an underside of the guide plate (45).

13. The caster as claimed in claim 12, wherein the passage (15) has a concavity (151) and the guide plate (45) has a reception recess (455), two ends of the return spring (46) are engaged with the concavity (151) and the reception recess (455).

14. The caster as claimed in claim 1, wherein a cushion pad (14) is connected to the casing (1) and located outside of the locking unit (12).

15. The caster as claimed in claim 14, wherein the cushion pad (14) is connected to a frame (141) fixed to the casing (1).

16. A caster comprising:

a casing having a shank radially connected to the casing and a locking unit located at a lower end of the shank;

two wheels respectively connected to two sides of the casing and a shaft extending through the two wheels and the casing, each of the two wheels having an inner gear connected thereto;

a direction unit being located in the casing and including a first lever having an opening therein, the first lever connecting the direction unit to the locking unit, the direction unit further including a first plate, a first piece and a first spring, the first plate including a pivot at a mediate portion thereof and being pivotally connected to the casing by the pivot, the first plate having one end thereof contacting an extension on an underside of the first lever, an other end of the first plate being inserted into a side notch of the first piece; and a brake unit being located in the casing and including a second lever, the second lever connecting the brake unit to the locking unit and the inner gears, the second lever being engaged with the opening of the first lever and sharing a common pivot with the first lever to respectively brake the caster and control direction of the caster.

* * * * *